United States Patent [19]

Tsutsumi

[11] Patent Number: 5,333,016
[45] Date of Patent: Jul. 26, 1994

[54] IMAGE DISPLAY APPARATUS

[75] Inventor: Kunihiro Tsutsumi, Kawasaki, Japan

[73] Assignee: Rohm Co., Ltd., Kyoto, Japan

[21] Appl. No.: 894,851

[22] Filed: Jun. 5, 1992

[30] Foreign Application Priority Data

Jun. 7, 1991 [JP] Japan .................................. 3-163506

[51] Int. Cl.⁵ ..................... H04N 5/262; H04N 5/272
[52] U.S. Cl. .................................. 348/589; 348/600; 345/113
[58] Field of Search ............... 358/148, 150, 153, 154, 358/155, 183, 181, 142, 146, 147; 345/113, 114; H04N 5/278, 5/272, 5/262, 5/265, 5/08, 5/10

[56] References Cited

U.S. PATENT DOCUMENTS

| | | | |
|---|---|---|---|
| 4,748,504 | 5/1988 | Ikeda et al. | 358/183 |
| 4,962,428 | 10/1990 | Tong et al. | |
| 5,014,128 | 5/1991 | Chen | 358/160 |

FOREIGN PATENT DOCUMENTS

| | | | |
|---|---|---|---|
| 0081175 | 4/1987 | Japan | H04N 5/6 |
| 0200876 | 9/1987 | Japan | H04N 5/10 |
| 0046076 | 2/1988 | Japan | H04N 5/278 |
| 0224574 | 9/1990 | Japan | H04N 5/278 |

Primary Examiner—James J. Groody
Assistant Examiner—Michael H. Lee
Attorney, Agent, or Firm—Fay, Sharpe, Beall, Fagan, Minnich & McKee

[57] ABSTRACT

An image display apparatus for determining a vertical display position according to the count given by a vertical address counter causes a circuit for counting horizontal synchronizing signals to be started according to a vertical synchronizing signal on receiving vertical and horizontal synchronizing signals, and resets the vertical address counter at the timing at which its count of at least more than one horizontal synchronizing signal is reached.

2 Claims, 4 Drawing Sheets

WAVEFORM SHAPING CIRCUIT

WAVEFORM CHART

WAVEFORM SHAPING CIRCUIT

WAVEFORM CHART

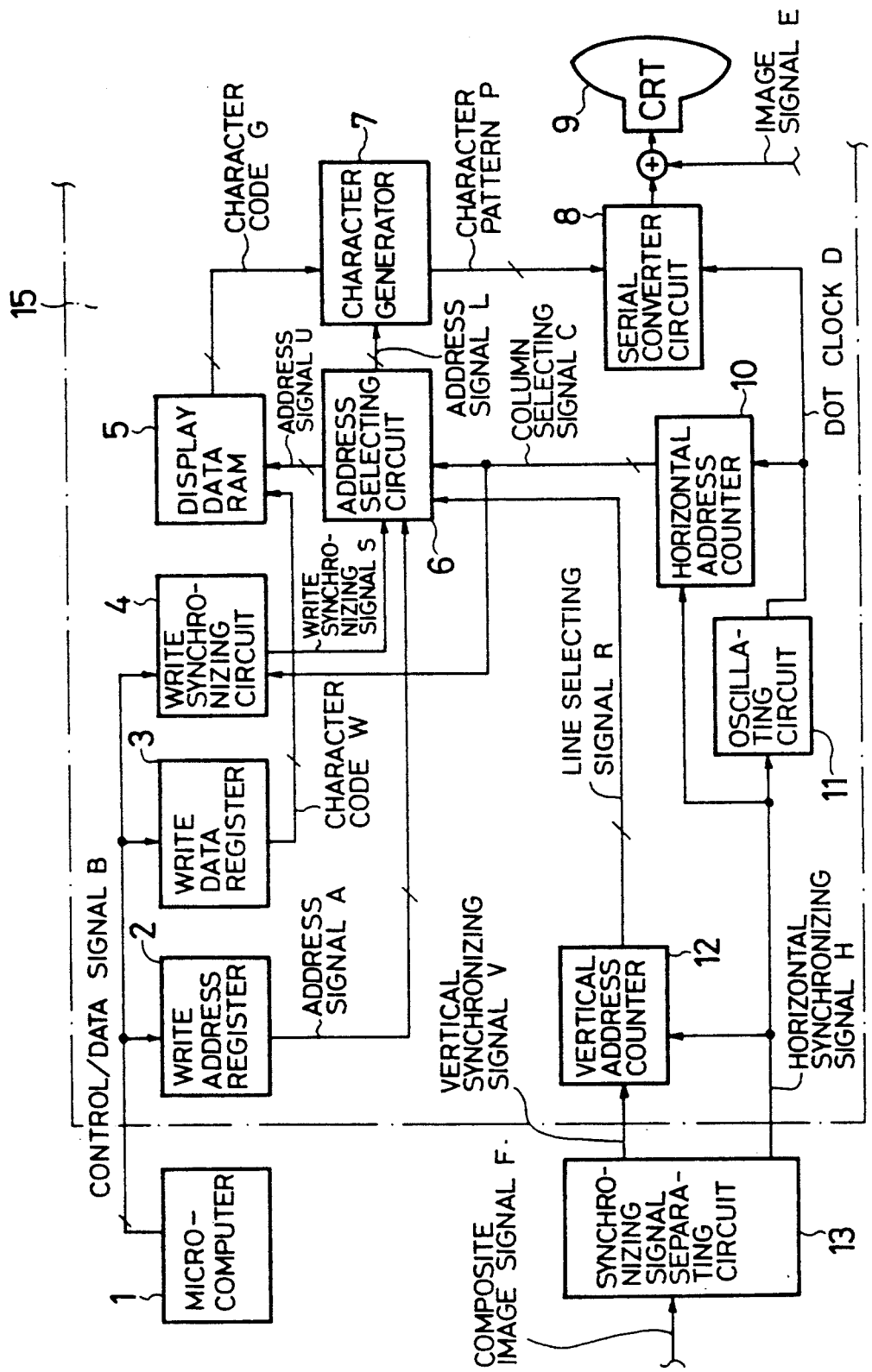

IMAGE DISPLAY APPARATUS

BACKGROUND OF THE INVENTION

1. Technical Field

The present invention relates generally to image display apparatus and more particularly to an image display apparatus for superimposing a digital image including characters and graphic titles on an image to be displayed according to a composite signal in a standard method under a rule, for instance, in the NTSC method. The present invention further relates to an image display apparatus having a so-called display digital positioning circuit (hereinafter simply called a "digital positioning circuit") containing a digital counter for determining a display position, such as a CRT display apparatus, a liquid crystal display apparatus and a plasma display having matrix pixels.

2. Background Art

FIG. 3 is a block diagram illustrating the configuration and operation of an image display apparatus equipped with a conventional digital positioning circuit, especially depicting its character image signal generating circuit portion.

The character image signal generating circuit 15 is provided with a display data RAM 5 for storing a plurality of character codes to be displayed.

In order to write a character code W supplied from a microcomputer 1 to the display data RAM 5, this circuit is provided with a write address register 2 for holding an address signal A out of control/data signals B from the microcomputer 1, a write data register 3 for holding the character code W, a write synchronizing circuit 4 for generating a write synchronizing signal S according to the control signal therein, and an address selecting circuit 6 for generating an address signal U directed to the display data RAM 5 on receiving the write signal S from the write synchronizing circuit 4.

In order to read a display character code G from the display data RAM 5, the character image signal generating circuit 15 is provided with a vertical address counter 12 for generating a line selecting signal R on receiving a vertical synchronizing signal V and a horizontal synchronizing signal H from a synchronizing signal separating circuit 13 and for applying the line selecting signal R to the address selecting circuit 6; an oscillating circuit 11 for generating a dot clock D on receiving the horizontal synchronizing signal H; and a horizontal address counter 10 for generating a column selecting signal C on receiving the horizontal synchronizing signal H and the dot clock D and for applying the column selecting signal C to the address selecting circuit 6 and the write synchronizing circuit 4.

In order to display a pattern of the character code thus selected, the character image signal generating circuit 15 is further provided with a character generator 7 for generating a character pattern P equivalent to one line out of the pattern equivalent to one character on receiving an address signal L generated in the address selecting circuit 6 and the character code G thus selected, and a serial converter circuit 8 for sequentially outputting a character pattern having a plurality of bits equivalent to one line dot by dot through the dot clock D. The output signal of the serial converter circuit 8 is combined with another image signal E before being applied to CRT 9 on which a superimposed image is displayed.

A description will subsequently be given of the operation of the character image signal generating circuit 15 thus arranged when the character code W supplied from the microcomputer 1 is written to the display data RAM 5.

When the microcomputer 1 supplies a character code to be written to the display data RAM 5 as its data to the write data register 3 according to the control/data signal B, the write data register 3 as a recipient holds the data as the character code W and then supplies the data to the display data RAM 5. When the microcomputer 1 supplies an address of the display data RAM 5 to be written thereto as its data to the address register 2 according to the control/data signal B, the write address register 2 as a recipient holds the address signal A and supplies it to the display data RAM 5. When the microcomputer 1 supplies to the write synchronizing circuit 4 information about the fact that the write address register 2 and the write data register 3 respectively hold the address signal A and the character code W in the form of a control signal according to the control/data signal B, the write synchronizing circuit 4 as a recipient tries to apply a write synchronizing signal S to the display data RAM 5.

At this time, however, the write synchronizing circuit 4 outputs the write synchronizing signal S while avoiding the timing at which the character code G is being read from the display data RAM 5, provided that the display character code G selected by the address signal U generated by the address selecting circuit 6 that has received the line selecting signal R and the column selecting signal C is read in synchronization with the horizontal synchronizing signal H and the vertical synchronizing signal V. The illustration of an input signal directed to the write synchronizing circuit 4 necessary for making the above-noted decision has been omitted in FIG. 3. On receiving the write synchronizing signal S, the address selecting circuit 6 selects the address signal A and supplies this signal to the display data RAM 5 as the address signal U, whereby the character code W is written to the address designated by the address signal U in the display data RAM 5.

A description will subsequently be given of the operation of the circuit at the time the character code G to be displayed is selected and read from the display data RAM 5. On receiving the vertical synchronizing signal V, the vertical address counter 12 initializes its count and on receiving the horizontal synchronizing signal H, it counts up the value and outputs the line selecting signal R for determining the vertical position of a scanning line. On receiving the horizontal synchronizing signal H, the oscillation circuit 11 initializes the oscillation phase, and generates and outputs the dot clock D of a frequency corresponding to the horizontal scanning speed of the scanning line. On receiving the horizontal synchronizing signal H, the horizontal address counter 10 initializes its count and on receiving the dot clock D, it counts up the value and outputs the column selecting signal C for determining the horizontal position of the scanning line. The address selecting circuit 6 receives the line address signal R and the column address signal C thus generated, generates the address signal U intended for the display data RAM 5 and the address signal L intended for the character generator 7 by subjecting these address signals to computation in conformity with the corresponding storage modes, and supplies the results to the display data RAM 5 and the character generator 7, respectively.

On receiving the address signal U, the display data RAM 5 reads the character code G prestored at the address designated thereby and supplies it to the character generator 7. The character generator 7 may be a ROM for storing character patterns, for instance. On receiving the character code G, the character generator 7 selects a pattern (in a matrix configuration) equivalent to one character corresponding to the code and on receiving the address signal L, and outputs the character pattern P equivalent to one line in the pattern equivalent to the one character. The serial converter circuit 8 is mainly formed with a shift register and latches the character pattern P having a plurality of bits and, on receiving the dot clock D, outputs the dots one after another accordingly.

The image signal generated in the character image signal generating circuit 15 and sequentially output therefrom dot by dot is combined with the image signal E separated from a composite image signal F and applied to CRT 9. In this example, the vertical and horizontal coordinate positions of the display picture are determined by the line selecting signal R from the vertical address counter and the column selecting signal C from the horizontal address counter. Further, a dot image to be superimposed on the display image with the coordinates designated out of the coordinate positions determined as noted above is generated from the address selecting circuit 6, the display data RAM 5 and the character generator 7. Therefore, the determination of the display position of the dot image to be superimposed on the display picture is based on the counts given by the vertical address counter 12 and the horizontal address counter 10, the dot clock from the oscillation circuit 11 and the address selecting circuit 6, these constituting a digital positioning circuit.

As a specific example of the image display apparatus having the prior art digital positioning circuit, the character image signal generating circuit has been described. The vertical synchronizing signal V received by the vertical address counter 12 will subsequently be described.

The synchronizing signal separating circuit 13 is supplied with the composite image signal F in the standard method determined under the rule; generates the horizontal synchronizing signal H normally through the steps of extracting the horizontal synchronizing signal H from the composite image signal F by means of a high-pass filter formed with a differentiating circuit, and subjecting the signal thus extracted to wave shaping via an amplifier, a comparator or the like; and generates the vertical synchronizing signal V through the steps of extracting the vertical synchronizing signal V therefrom by means of a low-pass filter formed with an integrating circuit, and subjecting the signal thus extracted to wave shaping via the amplifier, the comparator or the like. The vertical synchronizing signal V thus generated resets the vertical address counter 12 at its trailing edge timing, whereby the vertical position is initialized.

However, the composite image signal F may pick up noise during the radio transmission, and its signal level may fluctuate vertically, which results in a difference of ½ H synchronizing timing between odd and even number lines, depending on the display image interlacing, and which also affects the vertical synchronizing signal V separated by the integrating circuit from the composite image signal F. Although the leading edge timing of the vertical synchronizing signal V is relatively stable, its trailing edge timing tends to become unstable (see X, Y of the signal V in the waveform chart of FIG. 2(b)).

On the other hand, the vertical address counter 12 receives the signal V in the waveform chart of FIG. 2(b) and is cleared while the signal remains at an "L" level. Consequently, the count starting timing fluctuates. In other words, the sequential relation between the line selecting signal R output from the vertical address counter 12 and the horizontal synchronizing signal H is unstable when the vertical synchronizing signal V is directly input to the reset input terminal of the vertical address counter 12, and thus the display position of the digital image tends to move up and down by one scanning line.

SUMMARY OF THE INVENTION

In an image display apparatus for determining a vertical display position in conformity with the count given by a vertical address counter according to the present invention, a counting circuit of horizontal synchronizing signals is started in agreement with the leading edge of a vertical synchronizing signal on receiving the vertical and horizontal synchronizing signals and resets a vertical address counter at the timing at which its count of more than one horizontal synchronizing signal is reached. More specifically, a waveform shaping circuit having a counter for counting the horizontal synchronizing signals is provided between a synchronizing signal separating circuit and the vertical address counter in the conventional circuit arrangement of FIG. 3. The waveform shaping circuit is used to synchronize the trailing edge of the vertical synchronizing signal separated and generated in the synchronizing signal separating circuit with the horizontal synchronizing signal, and the signal generated at fixed timing with respect to the horizontal synchronizing signal is input to the reset input terminal of the vertical address counter.

The waveform shaping circuit comprises, for instance, a first and a second D-type flip-flop, and a positive logic OR gate (=a negative logic AND gate) constituting a counter. The first D-type flip-flop receives at its clock input terminal the horizontal synchronizing signal separated and generated in the synchronizing signal separating circuit and the vertical synchronizing signal at its data input terminal. The second D-type flip-flop receives the horizontal synchronizing signal at its clock input terminal and, at its data input terminal, the positive logical output signal of the first D-type flip-flop. The positive logical OR gate receives the vertical synchronizing signal at its first input terminal and at its second input terminal, the negative logical output signal of the second D-type flip-flop. The vertical address counter does not directly receive the vertical synchronizing signal separated and generated in the synchronizing signal separating circuit, but receives at its reset input terminal the output of the positive logical OR gate.

The first and second D-type flip-flops in the above-mentioned case form a two-stage synchronizing counter with the horizontal synchronizing signal as a trigger and synchronously count two of the horizontal synchronizing signals.

With this arrangement, the first flip-flop is made to latch the vertical synchronizing signal separated in the synchronizing signal separating circuit synchronized with the horizontal synchronizing signal and the second flip-flop is made to cause a time delay amounting to a single scanning interval, so that a signal for generating the trailing edge of the vertical synchronizing signal can be generated at the following synchronizing signal. As an inverted signal of that signal is applied from the negative logical output terminal of the second flip-flop to the positive logical OR gate (=negative logical AND gate), the trailing edge of the vertical synchronizing signal separated in the synchronizing signal separating circuit can be generated at the fixed timing synchronized with the horizontal synchronizing signal as the output of the positive logical OR gate. Therefore, the leading portion of the signal and the vertical synchronizing signal are obtainable at the same timing at the output of the positive logical OR gate, whereas the trailing portion thereof is obtainable at the fixed timing synchronized with the horizontal synchronizing signal.

Since the vertical address counter is initialized in synchronization with the horizontal synchronizing signal on receiving the vertical synchronizing signal whose trailing edge is synchronized with the horizontal synchronizing signal at the fixed timing, the display image thus obtainable is not only stable but also free from vertical fluctuations.

Moreover, the display image remains unaffected even when a shift of ½ H occurs because of noise and interlacing.

It is therefore an object of the present invention to provide an image display apparatus comprising a digital positioning circuit capable of preventing a display image from vertically shifting even though a shift of ½ H arises because of noise and interlacing.

BRIEF DESCRIPTION OF THE DRAWINGS

FIG. 3 is a block diagram mainly illustrating a character image signal generating circuit of a convention image display apparatus.

DESCRIPTION OF THE PREFERRED EMBODIMENT

Figure 1:
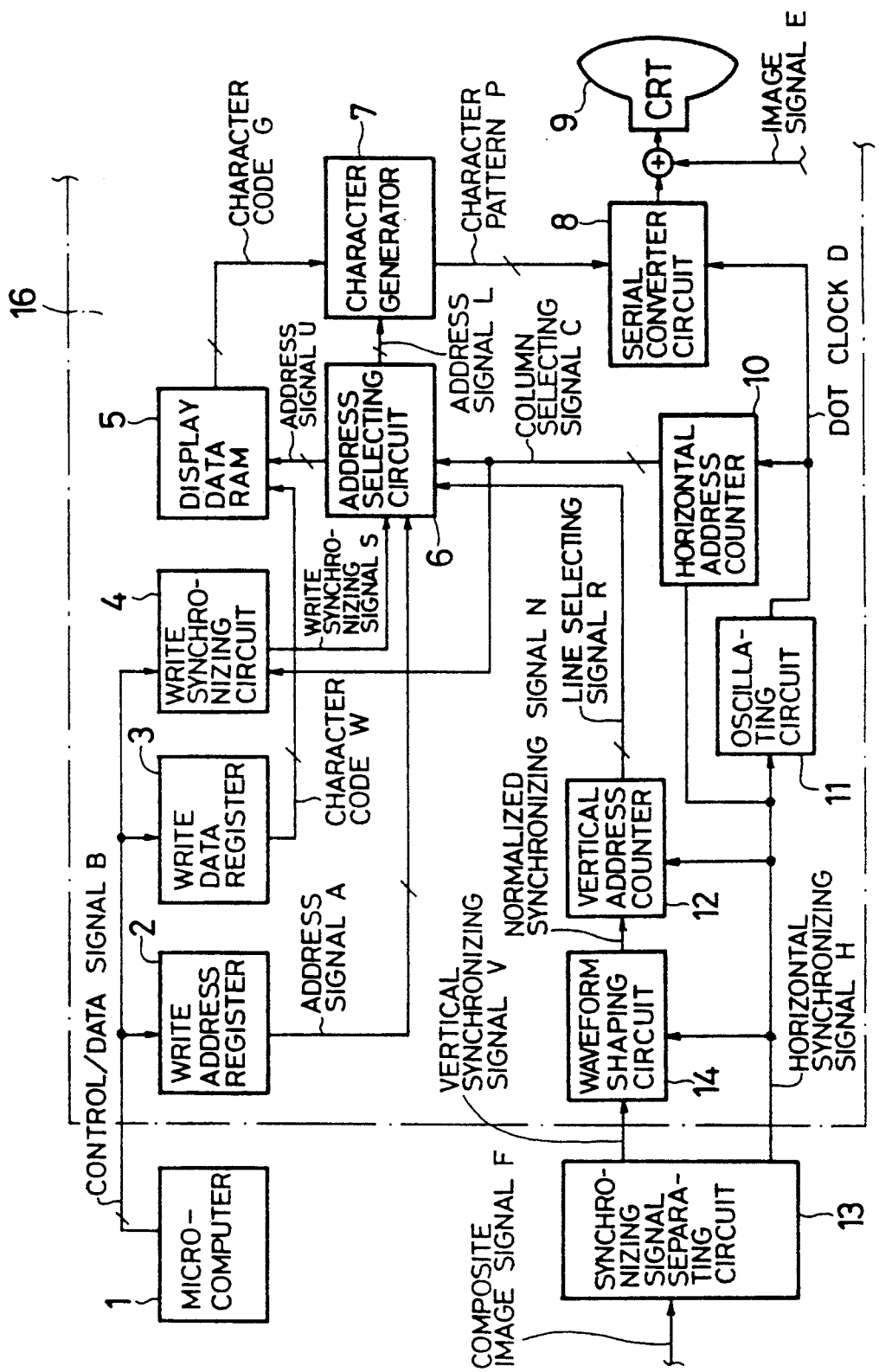
FIG. 1 is a block diagram mainly depicting a character image signal generating circuit of an image display apparatus embodying the present invention.

What makes a character image signal generating circuit 16 in this embodiment different from the character image signal generating circuit 15 of FIG. 3 is that a waveform shaping circuit 14 is provided between a synchronizing signal separating circuit 13 and a vertical address counter 12, which is supplied with a synchronizing signal N normalized with a horizontal synchronizing signal instead of a vertical synchronizing signal V.

Figure 2A:
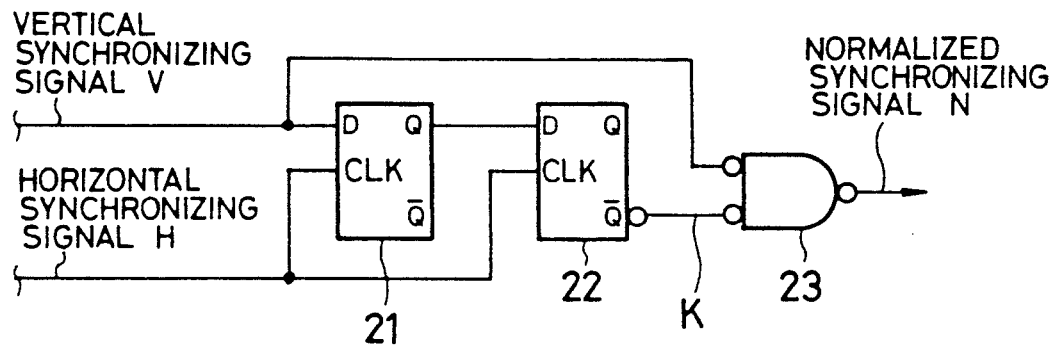
FIGS. 2(a), 2(b), 2(c) and 2(d) are circuit diagrams of a waveform shaping circuit featuring the image display apparatus of the present invention with a waveform chart illustrating corresponding signals.
Figure 2B:
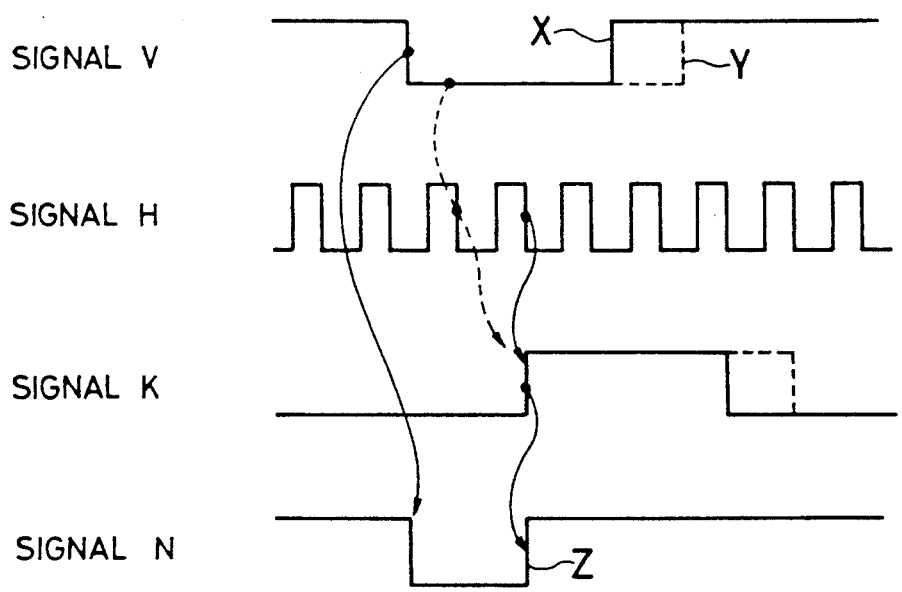

FIG. 2 is a circuit diagram of the waveform shaping circuit 14 (FIG. 2(a)) with a waveform chart illustrating corresponding signals (FIG. 2(b)). The waveform shaping circuit 14 featuring the image display apparatus of the present invention comprises D-type flip-flops 21, 22 and a negative logical AND gate 23 (a positive logical OR gate is similarly applicable). The D-type flip-flops 21, 22 form a counter for synchronously counting "2" of the horizontal synchronizing signals and start counting on receiving the vertical synchronizing signal.

The flip-flop 21 receives at its clock input terminal (CLK) the horizontal synchronizing signal H separated and generated in the synchronizing signal separating circuit 13, and the vertical synchronizing signal V at its data input terminal (D). The flip-flop 22 receives the horizontal synchronizing signal H at its clock input terminal (CLK) and, at its data input terminal (D), the positive logical output signal (Q) of the flip-flop 21. The negative logical AND gate 23 receives the vertical synchronizing signal H at one input terminal, and a signal K at the other input terminal from the negative logical output terminal (*Q) of the flip-flop 22 (Q* is an over bar Q in the drawing and means an inverted output with respect to the Q output). The vertical address counter 12 does not directly receive the vertical synchronizing signal V separated and generated in the synchronizing signal separating circuit 13, but receives at its reset input terminal the normalized synchronizing signal N from the negative logical AND gate 23.

Referring to FIG. 2(b), the operation of the waveform shaping circuit 14 according to the present invention will be described. The vertical synchronizing signal V separated and generated in the synchronizing signal separating circuit 13 (see the signal V in the waveform chart of FIG. 2(b)) is applied to the flip-flop 21 and the negative logical AND gate 23. The flip-flop 21 is made to latch the horizontal synchronizing signal H synchronously during the decay time of the horizontal synchronizing signal H (see the signal H in the waveform chart (b)) and the flip-flop 22 causes the signal to delay by a single scanning interval and then latch it synchronously during the following decay time of the horizontal synchronizing signal H. Subsequently, the inverted output signal K is output from the negative logical output terminal (*Q) of the flip-flop 22 and applied to the negative logical AND gate 23. In this way, the negative logical AND gate 23 shortens the rear end portion of the vertical synchronizing signal V this side to have the trailing edge at the timing delayed by 2 H after the generation of the vertical synchronizing signal, and generates the synchronizing signal N normalized by the horizontal synchronizing signal (see the signal N in the waveform chart (b)). The leading portion of the synchronizing signal N thus normalized is fixed at the same timing as the vertical synchronizing signal V, whereas the trailing portion thereof is synchronized with the horizontal synchronizing signal H and fixed at the timing corresponding to the horizontal synchronizing signal H with the count of 2 H after the generation of the vertical synchronizing signal V (see Z of the signal N in the waveform chart (b)). In this embodiment, the vertical address counter is reset about 1 H earlier than the conventional one and a point of time counting starts is shifted by one line this side. However, this poses practically no problem as the display position is shifted by only one line.

Figure 2C:
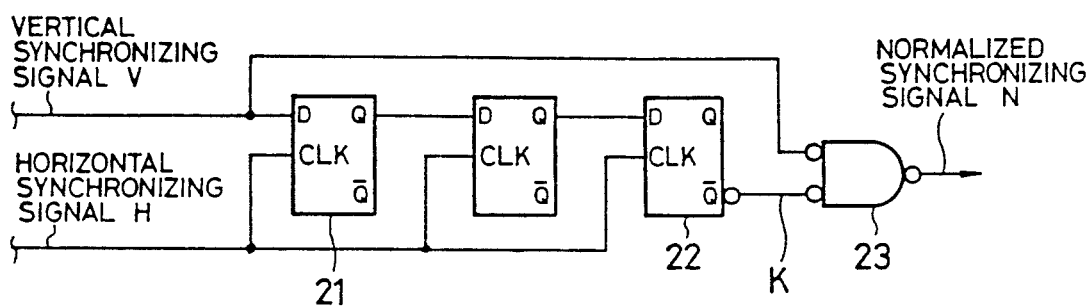
Figure 2D:
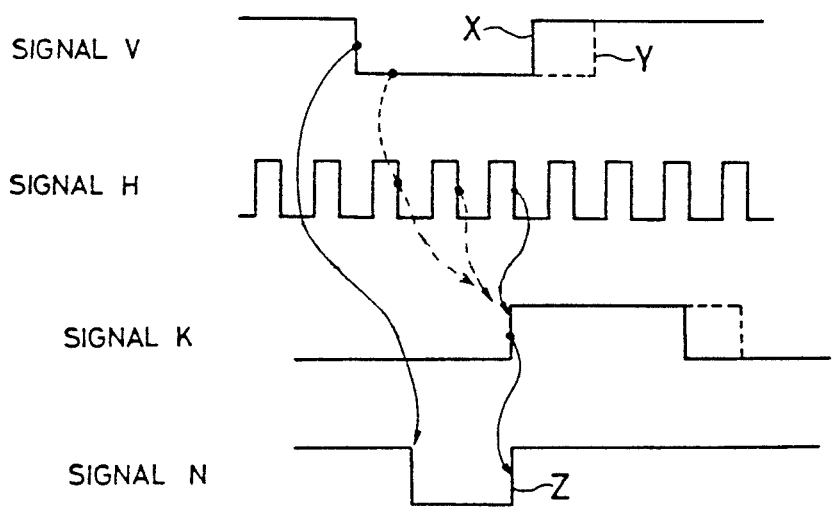

Moreover, a third D-type flip-flop may be provided between the first and second D-type flip-flops 21, 22 (see FIG. 2(c)). The third D-type flip-flop receives the horizontal synchronizing signal at its clock input terminal and, at its data input terminal, the positive logical output signal of the first D-type flip-flop 21. Further, the second D-type flip-flop 22 receives the positive logical output signal of the third D-type flip-flop in place of the positive logical output signal of the first D-type flip-flop at its data input terminal. This is a so-called synchronizing three-stage counter. In the waveform shaping circuit thus arranged, the delay time of the trailing edge of a vertical synchronizing signal is increased by a single scanning interval in contrast to the preceding embodiment (see FIG. 2(d)). As the display position can be set likewise as before, the same effect can be accomplished.

Therefore, the vertical address counter 12 is cleared in synchronization with the horizontal synchronizing signal H on receiving the normalized synchronizing signal in the image display apparatus according to the present invention. Consequently, the digital image is prevented from vertically shifting by one scanning line to ensure stable display.

The digital positioning circuit thus arranged according to the present invention is not limited to the character image signal generating circuit as described in detail in the embodiment shown. The present invention is applicable to not only image display apparatus provided with digital image signal generating circuits and used to superimpose characters, titles and the like in televisions, VTRs, video cameras and laser disks but also to image display apparatus having digital positioning circuits for driving liquid crystal display units and matrix picture elements of plasma displays and the like.

As set forth above, the present invention has the effect of implementing the object of providing an image display apparatus capable of positioning display images with stability by adding a simple circuit.

Although the counter and the logical circuits are used to set the training edge of a vertical synchronizing signal in the embodiment shown, the provision of such a counter is not necessarily essential to the present invention. A shift register, for instance, may be used to set data according to a vertical synchronizing signal first, and then to shift the data according to a horizontal synchronizing signal. In combination with the logical circuits, it is possible to obtain the number of shifts and outputs with stages corresponding to the shifts.

What is claimed is:

1. An image display apparatus, comprising:
a synchronizing signal separating circuit for generating vertical and horizontal synchronizing signals on receiving a composite image signal;
a vertical address counter for starting to count said horizontal synchronizing signals on receiving the trailing edge of said vertical synchronizing signal at a reset input terminal thereof, wherein a vertical display position on a display is determined in accordance with the count given by said vertical address counter; and
a first and a second D-type flip-flop and either a positive logical OR gate or a negative logical AND gate, said first D-type flip-flop receiving said horizontal synchronizing signal at a clock input terminal thereof and said vertical synchronizing signal at a data input terminal thereof, said second D-type flip-flop receiving said horizontal synchronizing signal at a clock input terminal thereof and the positive logical output signal of said first D-type flip-flop at a data input terminal thereof, wherein either gate receives said vertical synchronizing signal at first input terminal thereof and the negative logical output signal of said second D-type flip-flop at a second input terminal thereof to deliver the output of either gate to said reset input terminal of said vertical address counter.

2. An image display apparatus, comprising:
a synchronizing signal separating circuit for generating vertical and horizontal synchronizing signals on receiving a composite image signal;
a vertical address counter for starting to count said horizontal synchronizing signals on receiving the trailing edge of said vertical synchronizing signal at a reset input terminal thereof, wherein a vertical display position on a display is determined in accordance with the counter given by said vertical address counter; and
a first, a second and a third D-type flip-flop and either a positive logical OR gate or a negative logical AND gate, wherein said first D-type flip-flop receives said horizontal synchronizing signal at a clock input terminal thereof and said vertical synchronizing signal at a data input terminal thereof, said second D-type flip-flop receiving said horizontal synchronizing signal at a clock input terminal thereof and the positive logical output signal of said first D-type flip-flop at a data input terminal thereof, said third D-type flip-flop receiving said horizontal synchronizing signal at a clock input terminal thereof and the positive logical output signal of said second D-type flip-flop at a data input terminal thereof, and either gate receiving said vertical synchronizing signal at a first input terminal thereof and the negative logical output signal of said third D-type flip-flop at a second input terminal thereof to deliver the output of either gate to said reset input terminal of said vertical address counter.

* * * * *